Patented May 29, 1934

1,960,880

UNITED STATES PATENT OFFICE 1,960,880

ACOUSTICAL MATERIAL

Herbert C. Smith, Los Angeles, Calif., assignor to Coast Insulating Company, a corporation of Delaware No Drawing. Application February 1, 1933, Serial No. 654,677

3 Claims. (Cl. 106—29)

The present invention relates to acoustical material and more particularly relates to the composition, application and manufacture of material of the kind set forth in Patent No. 1,824,240 issued to me on September 22nd, 1931.

Said material is composed of mineral wool wads each surrounded by a more dense shell of material such as magnesium oxychloride cement, which latter is of such limited quantity as to bind the encrusted wads together in a mass while leaving suitable intersticial spaces.

The said material is prepared by first tumbling the wads together with magnesite until the wool particles are coated or dusted with same. The resultant dry material may be kept in stock and when ready for use is prepared by adding a relatively small amount of magnesium chloride solution.

To those skilled in the art and familiar with the product set forth in the said patent, it is obvious that the total of oxide and chloride, or in any case the total of the cement or binder constituents, both wet and dry, should be carefully limited. Otherwise a dense product results and despite the presence of mineral wool the product would not be of suitable sound absorbing value.

In the said patent particular attention is given to the use of this material for moulding blocks or tile. Experience has shown these blocks or tile to be highly efficient, decorative and in fact highly practical though somewhat more costly than would be the case if the material in its wet form could be readily applied directly to the surface to be treated, particularly a ceiling.

Now it is well known that magnesite cement is quite viscous and when used in small amounts such as in the present material the entire mass is far from plastic. While I have successfully applied this material to a ceiling it was only by the exercise of considerable care and skill. In fact, a mass of the wet material is placed on a hawk; the material is then troweled upon the hawk to assume substantially the proportions of the space which it is to occupy on the ceiling, and then this mass is forced against the surface with sufficient impact. Upon removing the hawk it is sometimes found that the entire mass will not hold and will give way in part. This requires skilful manipulation of a trowel to reapply that portion of the material which does not at first hold.

Of course after the material is in place it will eventually set, and same may be hastened by heat or products of combustion, and the sound absorbing value of the cured product so applied is equally as high as that of the tile. However the cost for labor is high as compared with the otherwise efficient and economical product.

It is therefore an important object of this invention to provide a material of this class which may be applied as readily as any common plastic material without losing any of the absorptive qualities possessed by the aforesaid material. In attempting to solve this problem of application those skilled in the allied arts would seek to apply the usual expedients to produce plasticity, only to find that in so doing they produce a product, which upon having set, is possessed of an insufficient percentage of intersticial spaces; the coatings over the wads are not of the correct characteristic; the cement does not set or carbonize properly; and the final product is not of the same desirable appearance and acoustical value as the aforesaid tile.

I have discovered that I may alter the original product to provide a suitable condition of plasticity such as will expedite direct application of the wet material, while still retaining all the other properties.

It is another object of this invention to provide a mixture composed mainly of magnesite, magnesium chloride solution and mineral wool wads, which is very plastic and adhesive and in which the cement constituents are free to combine according to the phenomena peculiar to such cements and form a thin coating over each wad while joining the coated wads together in a decidedly porous mass.

Another object of the invention is to provide an agent which will act to increase the plasticity of a mixture of fibrous material and magnesium oxychloride cements. I am aware that various colloidal materials, which absorb or become occluded in, large amounts of water, are used to increase the plasticity of various plasters and plastic materials but these colloids have the disadvantage of rendering the finished product soluble again unless the product is actually fired, and of course the application of high temperature to an acoustically treated wall is impossible. It is therefore an object of the invention to provide an agent which while providing a gelatinous lubricant for the mass during application thereof, will become inert after the mass has "set" and will not invite moisture or cause the finished product to dissolve in case water is accidently applied to the finished material.

Another important object of this invention is to provide an agent which will add to the plasticity of the wet mass as a whole without floating the cement away from the wads and into the spaces between them.

It should be explained at this point that when the wads are coated with the dry cement constituent; which obviously cannot penetrate the wads to an appreciable depth; the dry material is found in the identical position which it is to occupy at all times henceforth. Now, when the chloride solution is added, the phenomenon is that of the dry constituent absorbing the wet constituent rather than the usual one of the dry constituent floating around in the solution until the desired mixture is produced.

To unduly increase the amount of cement constituents, or to promiscuously add fluids or agents for rendering the material more plastic will result in some of the dry cement constituent being washed from the wads and mixed with the wet constituents to such an extent that either the wads are entirely surrounded by and floating in the cement mixture, or the wads become unduly impregnated with cement or the wet element thereof. In the latter case the finished product may show outward appearances of being correct, whereas in reality the wads are not suitably resilient.

Therefore all objects of the invention concern the provision of a final product comprising wads of mineral wool or the like with substantially unimpregnated interiors, joined together by limited contact of more dense shells of a suitably permanent cement, to leave intersticial spaces for sound absorption; the entire product immediately ready for application being decidedly plastic and suitably adhesive but with the total material other than mineral wool being limited so that the mass is mobile and readily troweled by reason of individual wads being lubricated so as to provide a plastic mass; rather than the mass being plastic in the usual sense of the word by reason of the other ingredients being of sufficient mass to completely fill the intersticial spaces.

The present invention also provides for employing an agent which during the setting of the material is decidedly effective in retaining the mass in proper shape but which after the oxychloride cement has formed or partially set, becomes a minor factor and in no way alters the acoustical properties of the finished material.

While the formula and method about to be set forth is one which I have found in commercial practice to be most desirable it is subject to alteration within the scope of this invention.

In carrying out the said method I provide a quantity of shredded mineral wool, which as is generally known, comprises a multiplicity of wads of wool each readily separated from adjacent wads. The individual wad characteristic of commercial shredded wool is further developed by mixing or tumbling. In a suitable batch mixer I place:

250 pounds shredded mineral wool
100 pounds dry magnesite
10 pounds Karaya gum

This batch is mixed thoroughly for about four minutes and when this is done it will be observed that each individual wad is impregnated a slight distance inwardly with the dry magnesite and the dry gum and the major portion of the dry elements are taken up by the wads in this manner so that only a small percentage of the dry material remains free.

The result of this is that while the product may be kept in stock over long periods of time, the addition of a liquid to it results in a solution of the liquid and dry material taking place upon the surface of, and in the outer structure of, the wads; the latter, by reason of its fibrous nature acting to retain the final solution as well as it originally retained the dry elements.

To this batch add about 125 gallons of magnesium chloride solution consisting of about 56 pounds of magnesium chloride dissolved in water.

This solution is now added carefully to the batch of dry material as in a mixing box and is turned several times with a hoe, or mixing can be done in a machine if desired.

The mixture will be found to be decidedly plastic and the plasterer, without previous experience, can apply this material to a ceiling as readily as any common plaster.

Apparently the Karaya gum at first takes on a part of the total water and forms a jelly which adds to the general plasticity of the mass while providing a tacky quality which causes the individual wads to adhere suitably until the mass begins to set. Then apparently the chloride and oxide in setting take on some of the water while the remainder evaporates, but in any event, the gum does not retain the water to an extent to interfere with the phenomenon peculiar to a solution of magnesium oxide and magnesium chloride combining to form an insoluble cement.

The gum, which eventually loses all water, is a very minute fraction of the total and does not in any way alter the advantageous characteristics of the product and, the final product, particularly after aging, has the same characteristics of the product described in the aforesaid patent.

While the foregoing proportions are subject to change without departing from the scope of this invention; they are well suited to practice and produce the desired result and, in fact, it is found that owing to the ease with which it may be applied there is less tendency to compact the material than in the case of the material set forth in the aforesaid patent. As a result, air penetrates the mass more readily and not only is the sound absorbing quality thereby increased but the curing of the cement coating does not need to be hastened by heat or products of combustion.

The Karaya gum, being mixed in dry form with the magnesite, has the advantage of providing the entire cementitious solution with the desired quality essential to ready application altho its total bulk is but a small percentage of the total bulk of dry magnesite and gum combined and it is the proper admixture of this gum, or any suitable equivalent, to the material and at the correct stage, on which success depends.

The present method has a distinct advantage in that the dry product, composed of mineral wool wads coated with a mixture of dry magnesite and dry gum, can be shipped in this condition to a remote job with instructions to add the correct amount of a given strength of magnesium chloride solution, and this method insures the correct degree of plasticity without requiring that the workman exercise any skill in mixing other than that he is required to have in connection with ordinary magnesite compounds.

The finished product is, like the product described and claimed in the said patent, a foraminous structure of loosely joined wads each having a resilient mineral wool interior and a more dense thin shell of insoluble material. In this connection, it is believed to be of considerable importance that the dry powdered form of Karaya gum be mixed with the dry magnesite and dispersed over the outer surfaces of the wads prior to the addition of the chloride solution. This done, and after the mass has dried and set properly, the gum evidently enters into the finished structure and loses all its original hygroscopic qualities as is shown by the fact that water added to or applied to the finished and dried product will not dissolve or loosen same and there is no evidence of the gum acting to produce a jelly within the structure, once the product is completed.

Having described one practical composition and method for making same; that which I claim to be new and patentable is:

1. The method for producing an acoustic plaster consisting in mixing mineral wool wads with magnesite and dry Karaya gum and then adding a solution of magnesium chloride.

2. The method for producing an acoustic plaster consisting in mixing mineral wool wads with magnesite and dry Karaya gum and then adding a solution of magnesium chloride, the materials being in substantially the following proportion: 250 pounds of mineral wool wads, 100 pounds of magnesite, 10 pounds dry Karaya gum, 56 pounds of magnesium chloride, and 125 gallons of water.

3. The method for producing an acoustic plaster consisting in mixing wads of fibrous material with the dry oxide of an oxide-chloride cement and with dry water-soluble gum, and then adding a solution of the chloride of the oxide-chloride cement.

HERBERT C. SMITH.